United States Patent [19]

Bonk et al.

[11] Patent Number: 4,751,269

[45] Date of Patent: Jun. 14, 1988

[54] CROSSLINKED PRESSURE-SENSITIVE ADHESIVE

[75] Inventors: Thomas J. Bonk, Stillwater; Tsung-I Chen, Woodbury; Patricia M. Olson; Douglas E. Weiss, both of Minneapolis, all of Minn.

[73] Assignee: Minnesota Mining and Manufacturing Company, St. Paul, Minn.

[21] Appl. No.: 34,409

[22] Filed: Apr. 3, 1987

Related U.S. Application Data

[63] Continuation of Ser. No. 752,950, Jul. 8, 1985, abandoned.

[51] Int. Cl.$^4$ ............................................. C08L 61/28
[52] U.S. Cl. ...................................... 525/163; 428/355
[58] Field of Search .......................... 525/163; 428/355

[56] References Cited

U.S. PATENT DOCUMENTS 4,329,384 5/1982 Vesley et al. .......................... 428/40
4,404,246 9/1983 Charbonneau ...................... 428/212

Primary Examiner—Theodore E. Pertilla
Attorney, Agent, or Firm—Donald M. Sell; James A. Smith; Darla P. Neaveill

[57] ABSTRACT

A crosslinked pressure-sensitive high shear adhesive is provided which is comprised of:
(a) an acrylate terpolymer comprised of
  (i) at least one alkyl acrylate wherein the alkyl group has at least 5 carbon atoms and wherein a major portion of the alkyls have an alkyl group having from 5 to 12 carbon atoms;
  (ii) a second alkyl acrylate wherein the alkyl group has from 1 to 4 carbon atoms;
  (iii) at least one copolymerizable monoethylenically monomer selected from the group consisting of acrylic acid, methacrylic acid and itaconic acid; and
(b) an amine formaldehyde condensate, in an amount of from about 0.8 to 10 percent by weight of the terpolymer.

The pressure sensitive adhesive is particularly useful when it is combined with a reinforcing web and a reinforcing filler and applied to a carrier to form an adhesive tape. The adhesive is particularly useful in adhering the edges of a heat-recoverable sheet to one another to secure the closure during the closure process.

A chromophore-substituted trihalomethyltriazine is preferably used as an additional crosslinking agent.

8 Claims, No Drawings

CROSSLINKED PRESSURE-SENSITIVE ADHESIVE

This is a continuation of application Ser. No. 752,950 filed July 8, 1985, now abandoned.

TECHNICAL FIELD

This invention relates to a crosslinked pressure-sensitive adhesive which can be conveniently utilized in the form of a tape, the adhesive layer of which comprises a terpolymer of two alkyl acrylates and a copolymerizable acid, wherein the terpolymer is crosslinked.

BACKGROUND ART

U.S. Patent No. Re.24,906 discloses a pressure-sensitive adhesive tape, the adhesive of which consists essentially of a copolymer of 88 to 97 parts of alkyl acrylate and correspondingly 12 to 3 parts of a copolymerizable monomer such as acrylic acid. The copolymer provides excellent adhesion and holding power and experiences no substantial deterioration even after prolonged storage.

To improve certain properties, the acrylate copolymer adhesive has been crosslinked. For example, in U.S. Pat. No. 2,973,286, it is taught that solvent resistance is improved by crosslinking through the addition of an organic peroxide prior to the coating operation, and applying somewhat greater heat than would be necessary solely to dry the coating. U.S. Pat. Nos. 2,925,174; 4,286,047; 3,284,423; and 3,740,366 also are concerned with crosslinkable pressure-sensitive adhesive acrylate copolymers.

U.S. Pat. No. 4,396,675 discloses a crosslinkable adhesive comprising an acrylate copolymer of the type described in the aforementioned U.S. Pat. No. Re. 24,906, which consists of (a) a copolymer of greater than 90% of an acrylic acid ester of a non-tertiary alcohol, the only example of which is isooctyl acrylate, and less than about 10% of a copolymerizable monoethylenic monomer, such as acrylic acid, and (b) a latent crosslinking agent consisting of a lower alkoxylated amino formaldehyde condensate having $C_{1-4}$ alkyl groups, the crosslinking agent being present in a concentration of from about 0.1 to 10% by weight of the copolymer.

U.S. Pat. No. 4,404,246 discloses another storage-stable crosslinkable pressure-sensitive adhesive again based on the acrylate copolymer as described in aforementioned U.S. Pat. No. Re. 24,906, wherein the copolymerizable monomer acid comprises from about 10 to about 25% by weight of the total monomer, the adhesive layer including a crosslinking agent of a lower-alkoxylated amino formaldehyde condensate having $C_{1-4}$ alkyl groups in a concentration level of from about 0.1 to 0.8% by weight of the copolymer. This patent teaches the use of the acrylate monomer including both a $C_{5-15}$ acrylate and a $C_{1-4}$ acrylate, such as isooctyl acrylate and methyl, ethyl or butyl acrylates. The patent also teaches that levels of crosslinking agents above 0.8% should be avoided.

U.S. Pat. No. 4,329,384 discloses the use of polynuclear-chromophore-substituted halomethyl-s-triazines as crosslinkers for pressure-sensitive alkyl acrylate polymers.

SUMMARY OF THE INVENTION

The crosslinked pressure-sensitive high shear adhesive of the present invention is comprised of
(a) an acrylate terpolymer comprised of:
 (i) at least one alkyl acrylate wherein the alkyl group has at least 5 carbon atoms,
 (ii) a second alkyl acrylate wherein the alkyl group has from 1 to 4 carbon atoms;
 (iii) at least one copolymerizable monoethylenic monomer selected from the group consisting of acrylic acid, methacrylic acid, and itaconic acid; and
(b) an amine formaldehyde condensate, in an amount of from about 0.8 to about 10% by weight of the terpolymer.

The present invention also concerns a heat-activated adhesive tape which when applied and crosslinked has excellent resistance to peel forces combined with exceptionally high resistance to shear forces, especially at elevated temperatures. The novel tape should be considered useful for purposes not previously considered suitable for a pressure-sensitive adhesive tape, such as with the use of heat-recoverable substrates, preferably primed polyolefin substrates of that type. Although the adhesive is only slightly tacky before being heat-activated and becomes even less so after activation, its pre-activation tackiness is sufficient to provide immediate adhesion to most clean surfaces at ordinary room temperatures, yet tackiness is not so high as to prevent repositionability and its adhesive and cohesive strengths at high temperatures are excellent.

This invention also relates to an adhesive as described above further comprising a chromophore-substituted trihalomethyltriazine as an additional crosslinking agent along with the amine formaldehyde condensate.

DETAILED DESCRIPTION OF THE INVENTION

The acrylate terpolymers useful in the present invention are of the general type disclosed in U.S. Pat. No. 4,404,246. The preferred long chain alkyl acrylate ester of type (i) is isooctyl acrylate. The preferred short chain alkyl acrylate esters of type (ii) are ethyl and/or n-butyl acrylates. The preferred acidic monomer of type (iii) is acrylic acid.

The inclusion of the acrylic acid ester having from 1 to 4 carbon atoms in its molecules has been found to permit increased levels of the acid monomer, typically the hardening monomer because of the acid functionality, to be present without embrittlement of the composition upon crosslinking or total loss of tackiness thereof prior to crosslinking.

The relative amounts of monomers selected from each of the three types are selected to achieve the optimum adhesive properties for a given adhesive application. In general, the terpolymers are comprised of a major amount of the long chain alkyl acrylate of type (i), a minor amount of a short chain alkyl acrylate of type (ii), and an even more minor amount of the acidic monomer of type (iii). The preferred terpolymers are comprised of about 50% to about 60% by weight of the long chain alkyl acrylate, from about 32% to about 42% of the short chain alkyl acrylate, and from about 8% to about 13% by weight of the acidic monomer.

The terpolymer can be prepared by the addition polymerization of the desired monomers. The addition polymerization is preferably accomplished by the use of a photoinitiator and electro-magnetic radiation (e.g., UV, IR, microwave, etc.) in amounts sufficient to obtain a terpolymer of the desired molecular weight. Particular techniques of polymerization are disclosed in U.S. Pat. No. 4,181,752, the disclosure of which is incorporated herein by reference.

The adhesive composition also includes a crosslinking agent in an amount from about 0.8% to about 10% by weight of the terpolymer, preferably about 1% to about 8%. Amine formaldehyde condensates, e.g. lower-alkoxylated ($C_{1-4}$ alkyl groups) amine formaldehyde condensates are suitable crosslinking agents. An example of such a crosslinking agent is hexamethoxymethylmelamine, commercially available as CYMEL 303 from American Cyanamid (hereinafter Cymel 303). Further examples include tetramethoxy methyl commercially available as BEETLE 65 or tetrabutoxy methyl urea, commercially available as BEETLE 85, both from American Cyanimid. The alkoxylated crosslinking agent is particularly effective in amounts within the range of about 1 to about 6% by weight of the terpolymer.

The amount of crosslinking agent is preferably selected to range from about 5% to about 15%, on an effective equivalent basis based on the number of equivalents of acid monomer available for crosslinking. For example, Cymel 303 is known to have a theoretical molecular weight of 390 grams per mole and an effective equivalency of 2.2 which leads to an effective equivalent weight of 177.3 grams per equivalent. This figure is then used to compute the amount of Cymel 303 needed to react with the available acidic monomer in the terpolymer. When the preferred terpolymers useful in this invention are employed the most preferred levels of Cymel 303 range from about 2% to about 5% by weight of the terpolymer. Lower levels of crosslinking agent may provide insufficient internal strength for some applications and higher levels of crosslinking agent reduce the initial tack of the adhesive and are insufficient in increasing the crosslink density of the crosslinked adhesive due to low diffusion rates in the crosslinking composition.

Crosslinking agents useful in conjunction with the amine formaldehyde condensate as an additional crosslinking agent include chromophore-substituted trihalomethyltriazines, e.g. 4(3,4-dimethoxyphenyl)bis-trichloromethyl-s-triazine. Because such triazines absorb UV light, the amount of the crosslinker used should be adjusted, (i.e., minimized) consistent with the amount of UV light and photoinitiator to obtain the desired degrees of polymerization and crosslinking of the terpolymer. Suitable additional chromophore-substituted trihalomethyltriazines are described in U.S. Pat. No. 4,329,384, to Vesley et al., the disclosure of which is incorporated herein by reference thereto.

A mixture of an amine formaldehyde condensate and a chromophore-substituted trihalomethyltriazine is the preferred crosslinking agent. While the triazine crosslinker component tends to crosslink during the UV polymerization of the acrylate terpolymer, it has been found that such crosslinking, unlike amine formaldehyde condensate crosslinking, does not detrimentally reduce the tack of the acrylate terpolymer. This is believed to be due to the more uniform distribution of triazine crosslinks (crosslinking by UV presumably occurs through the alpha hydrogen atoms of the acrylate molecule) which allows longer segments of uncrosslinked terpolymer to move freely and thereby provide tack. The use of a mixture of amine formaldehyde condensate and a chromophore-substituted trihalomethyltriazine is especially preferred because it allows for the minimization of any disadvantages associated with each crosslinking agent without the sacrifice of the high shear strength of the adhesive. For example, an adhesive containing an amine formaldehyde condensate will age over time to reduce the tack of the adhesive, such that minimizing the amount of that crosslinker minimizes the aging of the adhesive. Also, the minimization of the amount of chromophore-substituted crosslinker minimizes the amount of UV radiation needed to prepare the adhesive, i.e. to ensure the desired degree of polymerization of the acrylate monomers of the terpolymer as well as the crosslinking thereof.

The adhesive of the present invention can be applied to a heat recoverable closure in any manner that will ensure that the closure will remain closed during the recovery process. The preferred means of applying the adhesive to the closure involves the application of an adhesive tape of this invention to the closure. The adhesive can be deposited on a carrier backing and/or release liner as a tape for application of the adhesive to the heat-recoverable substrate.

The adhesive tape of this invention can be manufactured via a procedure as taught in U.S. Pat. No. 4,181,752. In such a procedure, a mixture of the aforementioned monomers and an effective amount of a photoinitiator is partially polymerized by ultraviolet radiation to provide a syrupy composition having a coatable viscosity, e.g., from about 300 to 20,000 cps. The aforementioned crosslinking agent is added and the resulting mixture is coated onto a release liner and/or carrier backing.

The adhesive is also preferably impregnated into a reinforcing web. The reinforcing web is impregnated with the adhesive by any means sufficient to substantially saturate the web with adhesive. The reinforcing web is preferably impregnated with the adhesive by the procedures disclosed in U.S. Pat. No. 4,181,752.

The impregnated reinforcing web is preferably contacted by at least one release liner having a low adhesion surface and from which the reinforcing web can be applied to the heat-recoverable substrate. In a particularly preferred embodiment, the reinforcing web is impregnated with the partially polymerized monomer mixture and fed between two polyethylene terephthalate (PET) film release liners (PET such as Mylar film, available from duPont, pre-treated with a silicone release agent) which sandwich the impregnated web. The release liners are pressed against the web to ensure that little if any occluded air is present to inhibit the final polymerization. The entire sandwich structure is then exposed to ultraviolet radiation to complete the polymerization.

The adhesive is exposed to ultraviolet radiation in an inert environment to complete the copolymerization thereby providing a pressure-sensitive heat-activatable adhesive tape which can be immediately wound upon itself into a roll form for storage or shipment. Crosslinking of the amine formaldehyde condensate is easily avoided since very little heat is generated by the polymerization exotherm associated with this process. In addition to this preferred process, the monomer mixtures can be also polymerized with conventional peroxide-initiated solution polymerization techniques.

The reinforcing web is a porous flexible sheet material which is saturated with the adhesive and which maintains its structural integrity in at least one direction when subjected to the temperatures used to cause a heat-recoverable closure to recover, i.e. the direction of shrink. Examples of suitable reinforcing webs include fibrous webs of fiberglass and/or polyester. These webs may be non-woven or loosely woven, e.g. woven loosely enough to allow easy penetration of the non-polymerized adhesive solution. Preferred webs are the woven fiberglass scrims and woven fabrics of fiberglass and polyester wherein all parallel threads are of the same fiber material, i.e., the warp is fiberglass and the fill is polyester or vice versa.

The adhesive is especially useful when used as a closure adhesive for a heat recoverable sheet material and can be applied to the heat-recoverable sheet material in a variety of ways to secure the sheet during the recovery thereof as described in U.S. application Ser. No. 746,540, filed concurrently herewith and herein incorporated by reference thereto. For example, a portion of the adhesive coated carrier backing can be placed, adhesive side down, upon a sheet transverse to the direction of recovery which has been wrapped a partial turn around the structure to be enclosed. The carrier backing is removed and the wrapping of the sheet is then continued such that the remainder of the sheet is allowed to completely overlap the adhesive. A second layer of adhesive can be applied, before the wrapping is completed, to that sheet of the substrate which will contact and overlie the first layer of adhesive when the wrapping of the sheet is completed, but the use of such a second layer is not necessary. The adhesive is then activated by the application of heat which also serves to cause the sheet to recover. Of course, that portion of the sheet overlying the adhesive should be heated first to activate the adhesive before the rest of the sheet is heated to produce substantial shear force at the closure of the sheet.

Alternatively, the heat-recoverable sheet can be completely wrapped around the structure to be enclosed and the carrier tape applied to the longitudinal seam at the end of the circumferential wrap and partially overlapping portions of both the exposed longitudinal edge of the heat-recoverable sheet and the surface of the sheet underlying and extending from the exposed longitudinal edge. when applied in this manner, the reverse face of the carrier tape, i.e. that face not in contact with the sheet, is preferably covered with a flame retardant backing, which will prevent exposure of the adhesive to the flame used to cause the sheet to recover about the structure to which it has been applied. A flame retardant backing is any backing which will not propagate a flame when exposed to the heat necessary to shrink the sheet. Suitable flame retardant backings include synthetic fabrics such as KEVLAR from DuPont and coatings such as highly loaded carbon black in acetone acryloid. A particularly preferred flame retardant backing is woven cotton fabric pretreated with a flame retardant such as diammonium phosphate.

In accordance with the foregoing, the use of a terpolymer having higher than conventional acid functionality and the use of elevated levels of the alkoxylated condensate crosslinking agent and/or the use of a triazine crosslinking agent allow the formulation of a composition which is moderately tacky, thus allowing easy repositionability, but which is capable upon heating of crosslinking rapidly to a stiff composition which is non-flowable and provides substantial shear and peel resistance.

It has been found desirable to incorporate in the adhesive composition a reinforcing filler. Such fillers include chemically inert solids, generally particulate or fibrous solids. General examples include glass fibers, microfibers, mineral fibers, glass beads or bubbles, clay, metal oxides and the like. These may also be treated with a surface active agent, e.g. a vinylsilane, to enhance surface wetting of the filler by the adhesive thereby providing better reinforcement. A particularly preferred example of a reinforcing filler is CAB-O-SIL which is a fumed silica, commercially available from Cabot Corp. Levels of reinforcing filler range from about 2% to about 7% by weight preferably 3% to 6%. Amounts less than about 2% are often insufficient to reinforce the adhesive and amounts in excess of 7% may cause problems in processing due to the high content of non-liquid materials of the composition.

The filler is incorporated into the adhesive composition prior to polymerization to reinforce the adhesive when crosslinked, much like carbon black in rubber or elastomer compositions. When such a filler is incorporated, the thixotropic mixture obtained does not require the aforementioned prereaction to afford an increase in coating viscosity, and as a result is capable of wetting a reinforcing web more quickly and thoroughly.

It has been found that to achieve consistently superior bonding of the pressure-sensitive adhesive during the recovery process to low surface energy heat-recoverable sheet materials such as polyolefins, a primer must be utilized. A primer is not necessary for heat-recoverable sheet materials prepared from polyesters or polyamides which have higher surface energies.

The surface of the heat-recoverable sheet to which the adhesive is to be applied is preferably primed prior to the application of the adhesive of this invention. The priming of the sheet material can be accomplished by the procedures described in U.S. application Ser. No. 583,896, filed Feb. 27, 1984, now U.S. Pat. No. 4,563,388, incorporated herein by reference thereto. This priming of the sheet is achieved by graft polymerizing to at least a portion of the closure at least one monomer selected from the group consisting of acrylic acid, methacrylic acid, and esters thereof; acrylamide, methacrylamide; sterically non-hindered tertiary alkyl acrylamides and methacrylamides, secondary alkyl acrylamides and methacrylamides having three or less carbon atoms in the alkyl group; and N-vinylpyrrolidone. The graft polymerization is preferably conducted by coating the desired portion of the sheet with a composition comprised of at least one of the above monomers and irradiating that coated portion with ionizing radiation, e.g., electron beam radiation. The preferred primary composition is comprised of a major amount of N,N-dimethylacrylamide, and minor amounts of an alkoxy methylolamino compound, e.g., CYMEL 303 availale from American Cyanamid, a polyacrylate, e.g., trimethylopropane triacrylate, and alkanol, e.g., n-butanol and trace amounts of a surfactant and an acid or mineral chain transfer agent, e.g., nitric acid or salts of silver, copper, etc.

Primer can be applied to the heat-recoverable sheet by utilizing, for example, a fine knurl gravure coater and irradiated as a thin, nearly invisible film by electron beam. The thinnest coating possible is most desirable to optimize product appearance and effectiveness of the primer, i.e., the amount of primer on the heat-recoverable sheet is preferably minimized.

The adhesives and adhesive tapes of this invention are useful in a variety of applications. They are especially useful in joining primed polyolefin surfaces between which high shear forces are encountered; i.e. the adhesive possesses high cohesive strength which prevents slippage between the polyolefin surfaces. The adhesive tapes of the present invention are especially useful in maintaining the closure of heat-recoverable sheet material during the recovery of such sheet materials when used a wrap-around protective closures. Such closure adhesives are to be distinguished from the hot melt adhesives used with heat-recoverable closures to adhere the closure to the article being enclosed. The hot melt adhesive placed between the closure and the structure to be enclosed is not effective in securing the heat-recoverable closure during recovery because it is in a melt activation phase during the recovery process.

EXAMPLES

EXAMPLES 1-15

In the following examples, all amounts are expressed in terms of parts by weight. A mixture of isooctyl acrylate (IOA), butyl acrylate (BA) and acrylic acid (AA), in the amounts shown in Table I, was placed in a glass jar and swirled gently to mix. To this was added 0.1 part by weight of 2-phenyl-2,2-dimethoxyacetophenone (Irgacure 651) photoinitiator and the indicated amounts of hexamethoxymethyl melamine (Cymel 303) and/or 4(3,4-dimethoxyphenyl)-bistrichloromethyl-s-triazine as crosslinker. After each of these additions the jar was swirled until the material was observed to be in solution. The indicated amount of fumed silica ("Cab-O-Sil" M5) was added incrementally with swirling to "wet out" each portion and the mixture was subsequently sheared until a solution of coatable viscosity was obtained.

The solution was next coated into a loosely woven fiberglass scrim to a thickness of 10 mils between 0.05 millimeter thick transparent biaxially-oriented films of polyethylene terephthalate, the facing surfaces of which had been previously treated with a release agent. Exposure to ultraviolet radiation which continued for 13 minutes beyond the observed exotherm substantially completely polymerized the fiberglass scrim-reinforced coating to a pressure-sensitive adhesive state.

Dynamic Shear

A strip of fiberglass scrim-reinforced tape was adhered by its adhesive layer to a primed polyethylene substrate by firm hand pressure applied through the end of a tongue depressor with a free end of tape extending beyond the substrate and the adhesive contact bond area being 1 inch by ½ inch. When testing was to be done at an elevated temperature, this substrate was first adhered to stiff aluminum to impart rigidity while testing. An alternate method was to use the adhesive layer of a fiberglass scrim-reinforced tape to bond two freshly cleaned aluminum strips together with a bond area of 1 inch by ½ inch. The bond was tested in shear in an Instron tensile tester at a jaw separation rate of about 1 millimeter per second.

Rheological Properties (ODR)

Pairs of adhesive discs, each disc 1¼ inch in diameter and ⅛ inch in thickness, were prepared by repeatedly layering sheets of polymerized adhesive which contains no fiberglass using firm hand pressure applied through the end of a tongue depressor until the required thickness was obtained or by using ultraviolet radiation to cure unpolymerized adhesive solution which had been poured into appropriately sized wells and covered with a release agent treated transparent biaxially-oriented film of polyethylene terephthalate for 13 minutes beyond the observed exotherm. One of each pair of adhesive discs had a ⅜ inch diameter hole punched in its center which accomodates the shaft of the metal disc in a Monsanto Oscillating Disc Rheometer (ODR). The other adhesive disc was placed on top of the ODR disc. The chamber, which had been previously heated to a temperature sufficient to crosslink the adhesive, was closed and the metal disc was started oscillating through an arc of 3 degrees. The test was continued until the generated graph indicated that a peak had occurred or until it became obvious that no peak was likely to occur.

Peel Adhesion Value

A strip of fiberglass scrim-reinforced tape was adhered to either a primed polyethylene substrate or a freshly cleaned aluminum substrate using firm hand pressure applied through the end of a tongue depressor and leaving a long end free. when testing was to be done at an elevated temperature from primed polyethylene, this substrate was first adhered to stiff aluminum to impart rigidity while testing. The free end of the tape was grasped by the jaws of an Instron tensile tester while the substrate was restrained in an apparatus which ensures a peelback of 90 degrees. The tape was pulled from the substrate at a rate of about 1 millimeter per second.

Swell Measurement Value

A 1 inch diameter disc weighing about 0.3 g was cut from a sheet of polymerized adhesive which contained no fiberglass or other reinforcing scrim. The disc was accurately weighed and then placed in a 4 oz. jar containing 30 g of methyl ethyl ketone (MEK) and allowed to swell at room temperature for 24 hours. The disc was then removed from the MEK and accurately weighed. The amount of MEK absorbed by the adhesive disc sample was calculated using the following equation:

$$\text{Swelling Index } (Q) = \frac{\text{Swollen adhesive disc weight}}{\text{Initial adhesive disc weight}} - 1$$

The samples were aged in an oven at 150° F. for the number of days shown or cured at 350° F. for 4 min.

Sleeve Test

Closure strips were prepared for application testing by laminating a suitably flame retardant cotton cloth (boot duck 2818/40 available from Burcott Mills, Chicago, Ill., saturated with a solution of diammonium phosphate and dried) to one side of each of the fiberglass scrim-reinforced tapes (examples 1-15) and then trimming them into strips 1.5 inches wide and 12 inches long. Sleeves were prepared from graft-primed (primed in accordance with Example 27 of U.S. application Ser. No. 583,896, filed Feb. 27, 1984, now U.S. Pat. No. 4,563,388) polyethylene heat-recoverable sheet material having the characteristics shown below:

Backing characteristics:
Extruded Caliper=0.100 inches
Stretched Caliper=0.028 inches
Recovered Caliper=0.097 inches
Shrink ratio=3.8
Shrink force=9.6 pli
M-100=51.8 psi
% gel=98%

The sheet material had a 20 mil layer of extruded hot melt adhesive on the reverse side. The sheet was trimmed to 12 inches in the "cable length" direction and 8 inches in the "circumferential" or "recovery" direction to form a sleeve The tape was then ½ lapped to one edge of the sleeve, the sleeve was wrapped circumferentially around a 1.9 inch diameter cable and overlayed an inch before mating the remaining ½ lap of exposed tape to the backing surface thus creating a closed and overlapped sleeve of 2.6 inches in diameter. The closure strip was rubbed firmly with a tongue depressor to ensure uniform contact to the backing surface.

A MAPP (stabilized methylacetylenepropadiene available from Airco, Inc., Murray Hill, N.J.) gas torch with a bushy flame was used to shrink the sleeve down on to the cable. The heat was applied to the area of the closure strip first to activate the adhesive and then to the sleeve backing. The geometry chosen allowed the sleeves to recover about 25%, leaving a residual recovery force of about 5.4 pli which the closure strips must hold. The sleeves were heated for about 3–5 minutes to ensure activation of the hot melt and it is at this point that the viscosity thins sufficiently to transfer substantially all of the recovery force to the closure strip. If the tape closure held this force it passed the test (H=hold), if it opened up it failed (R=release). It should be noted that an R rating, e.g., a release may be due to primer and/or sheet failure as well as adhesive failure such that an R rating does not necessarily denote failure of the adhesives of this invention.

EXAMPLES 20–25

The rheological properties at 180° C. of a fully cured terpolymer of IOA/BA/AA:53%/36%/11% cured with varying levels of CYMEL 303 are shown in Table III. The results shows that the effect of additional crosslinking agent is linear up to about ½ equivalent but falls off asymptotically at levels about ⅛ equivalent.

TABLE III

| Example | CYMEL 303 (wt %) | CYMEL 303 (Equiv. Fraction) | ODR (in-lb) |
|---|---|---|---|
| 20 | 13.5 | ½ | 32.9 |
| 21 | 6.8 | ¼ | 27.5 |
| 22 | 3.4 | ⅛ | 21.2 |
| 23 | 1.7 | 1/16 | 12.1 |
| 24 | 0.8 | 1/32 | 8.1 |
| 25 | 0.4 | 1/64 | 6.0 |

What is claimed is:

1. A crosslinked pressure-sensitive heat-activated high shear adhesive composition comprising:
   (a) an acrylate terpolymer comprised of:
      (i) at least one alkyl acrylate wherein the alkyl group has at least 5 carbon atoms and wherein a major portion of the alkyls have an alkyl group having from 5 to 12 carbon atoms;
      (ii) a second alkyl acrylate wherein the alkyl group has from 1 to 4 carbon atoms;
      (iii) at least one copolymerizable monoethylenic monomer selected from the group consisting of acrylic acid, methacrylic acid and itaconic acid; and
   (b) an amine formaldehyde condensate, in an amount of from about 1.0 to 10 percent by weight of the terpolymer.

2. An adhesive composition in accordance with claim 1 wherein the crosslinking agent is a lower alkoxylated amine formaldehyde condensate.

3. An adhesive composition in accordance with claim 1 further comprising a chromophore-substituted trihalomethyltriazine.

TABLE I

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| IOA | 52 | 55 | 52 | 53 | 55 | 52 | 52 | 55 | 55 | 55 | 55 | 55 | 55 | 55 | 55 |
| BA | 32 | 35 | 32 | 34 | 35 | 32 | 32 | 35 | 35 | 35 | 35 | 35 | 35 | 35 | 35 |
| AA | 16 | 10 | 16 | 13 | 10 | 16 | 16 | 10 | 10 | 10 | 10 | 10 | 10 | 10 | 10 |
| Cymel 303 | 3.5 | 2.2 | 2.36 | 2.4 | 1.48 | 2.36 | 3.5 | 2.2 | 1.48 | 2.2 | — | — | — | — | 0.5 |
| Cab-O-Sil M5 | 6 | 6 | 6 | 5 | 6 | 4 | 4 | 4 | 4 | 4 | 6 | 4 | 4 | 4 | 4 |
| XL-353 | — | — | — | — | — | — | — | — | — | — | — | 0.1 | 0.15 | 0.20 | 0.1 |
| Aged Time (Days) | | | | | | | Swelling Index (Q): | | | | | | | | |
| 0 | 19.1 | 17.8 | 17.9 | 22.5 | 14.3 | 20.9 | 17.9 | — | — | — | — | 13.06 | 15.52 | 15.30 | 8.04 |
| 1 | 3.73 | 4.79 | 4.2 | 4.43 | 5.54 | 4.03 | 4.07 | 7.12 | 8.21 | — | — | — | — | — | — |
| 3 | 2.54 | 3.54 | 3.12 | 3.47 | 4.33 | 3.39 | 2.97 | 4.27 | 4.97 | — | — | — | — | — | — |
| 5 | 2.36 | 2.92 | 2.89 | 3.11 | 3.86 | 3.03 | 2.64 | 3.68 | 4.36 | — | — | — | — | — | — |
| 10 | 1.90 | 2.5 | 2.48 | 2.54 | 3.03 | 2.74 | 2.21 | 3.16 | 3.67 | — | — | — | — | — | — |
| Cured at 350° F., 4 minutes | 2.23 | 3.33 | 2.91 | 3.56 | 5.93 | 4.97 | 3.39 | 8.89 | 9.21 | 4.18 | — | — | — | — | 6.16 |
| Sleeve Test | R | R | H | R | H | H | R | H | R | H | R | H | — | — | H |

EXAMPLES 16–19

The dynamic shear, rheological properties and peel adhesion values were measured for a terpolymer of IOA/BA/AA:52%/32%/16%, respectively, with varying amounts of Cymel 303 crosslinker, and Cab-O-Sil reinforcing filler to show the effect of these components. Examples A and B, without a crosslinker, are shown for comparsion.

TABLE II

| Example | Cymel 303 (wt %) | Cab-O-Sil (wt %) | ODR (in.-lb.) | Shear 23° C. | Shear 180° C. | Peel 23° C. | Peel 180° C. |
|---|---|---|---|---|---|---|---|
| 16 | 2.5 | — | 16.8 | — | — | — | — |
| 17 | 3.5 | — | 20.4 | 120 | 22 | 4 | 1.5 |
| 18 | 3.5 | 6 | 30.0 | — | — | — | — |
| 19 | 5.0 | — | 24.2 | — | — | — | — |
| A | — | — | 4.0 | — | — | — | — |
| B | — | 6 | 6.6 | — | — | — | — |

4. An adhesive composition in accordance with claim 3 wherein the chromophore-substituted crosslinking agent is 4(3,4-dimethyxophenyl)-bistrichloromethyl-s-triazine.

5. An adhesive composition in accordance with claim 1 further comprising a reinforcing filler.

6. An adhesive composition in accordance with claim 5 wherein the reinforcing filler is fumed silica.

7. An adhesive composition in accodance with claim 6 wherein the fumed silica is present at a concentration of about 2% to about 7% by weight of the adhesive.

8. An adhesive composition in accordance with claim 7 wherein the fumed silica is present at a concentration of about 3% to about 6% by weight of the adhesive.

* * * * *

UNITED STATES PATENT AND TRADEMARK OFFICE
CERTIFICATE OF CORRECTION

PATENT NO. : 4,751,269

DATED : June 14, 1988

INVENTOR(S) : T.J. Bonk et al.

It is certified that error appears in the above-identified patent and that said Letters Patent is hereby corrected as shown below:

Col. 1, line 37 - "aforemenlioned" should be --aforementioned--.

Col. 1, line 59 - "weiqht" should be --weight--.

Col. 9, line 4 - "g inches" should be --9 inches--.

Col. 9, line 5 - "sleeve The" should be --sleeve. The--.

Signed and Sealed this

Twenty-fourth Day of October, 1989

*Attest:*

DONALD J. QUIGG

*Attesting Officer*         *Commissioner of Patents and Trademarks*